(12) United States Patent
Hoctor et al.

(10) Patent No.: US 7,499,711 B2
(45) Date of Patent: *Mar. 3, 2009

(54) TRANSMITTER LOCATION FOR ULTRA-WIDEBAND, TRANSMITTED-REFERENCE CDMA COMMUNICATION SYSTEM

(75) Inventors: Ralph Thomas Hoctor, Saratoga Springs, NY (US); John Erik Hershey, Ballston Lake, NY (US); Nick Andrew Van Stralen, Ballston Lake, NY (US); Harold Woodruff Tomlinson, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1194 days.

This patent is subject to a terminal disclaimer.

(21) Appl. No.: 10/609,891

(22) Filed: Jun. 30, 2003

(65) Prior Publication Data

US 2004/0002347 A1 Jan. 1, 2004

Related U.S. Application Data

(63) Continuation-in-part of application No. 09/973,140, filed on Oct. 9, 2001, now Pat. No. 7,269,427.

(51) Int. Cl.
*H04Q 7/20* (2006.01)
*H04M 11/04* (2006.01)
*H04M 1/00* (2006.01)
*H04B 7/00* (2006.01)

(52) U.S. Cl. .............. 455/456.1; 455/556.2; 455/456.2; 455/404.2; 455/524; 455/550.1; 455/561

(58) Field of Classification Search ... 455/456.1–456.6, 455/16, 67.11, 433, 440, 524–526, 550.1, 455/556.2, 561, 41.1–41.3, 100–105, 115.1, 455/132, 224–225, 404.1–404.2, 410–411, 455/418–420, 422.1, 457–458, 3.01, 66.1, 455/67.16, 91, 95–96, 226.1–226.4, 424; 369/13.2, 30; 340/426.19, 426.2, 426.21, 340/426.22, 989–994, 539.1–539.19, 539.32, 340/572.1, 572.7, 573.1–573.4, 539.21–539.23, 340/540–541, 686.6, 825.49, 7.25; 330/305–306; 381/320–321; 701/300–302, 207, 209, 213–216, 701/225; 342/125–134; 348/116
See application file for complete search history.

(56) References Cited

U.S. PATENT DOCUMENTS 5,987,329 A 11/1999 Yost et al.
6,111,536 A 8/2000 Richards et al.

(Continued)

FOREIGN PATENT DOCUMENTS

JP 08-146110 A 6/1996

*Primary Examiner*—Meless N Zewdu
(74) *Attorney, Agent, or Firm*—Patrick K. Patnode

(57) ABSTRACT

A system and method involve determining the location of objects within an area of interest using wireless signals. The system includes at least three base stations communicating with a central processor and a plurality of mobile devices. Further, at least one fixed beacon transmitter of known location may be provided. The mobile devices transmit a wireless signal to the base stations, which then determine a location of the mobile devices based on time difference of arrival information between the mobile devices measured at all the base stations.

22 Claims, 5 Drawing Sheets

U.S. PATENT DOCUMENTS

| | | | |
|---|---|---|---|
| 6,275,705 B1 * | 8/2001 | Drane et al. | 455/456 |
| 6,300,904 B1 * | 10/2001 | Dvorak et al. | 342/457 |
| 6,360,078 B1 * | 3/2002 | Driedger et al. | 455/67.11 |
| 6,466,125 B1 * | 10/2002 | Richards et al. | 340/5 |
| 6,473,038 B2 * | 10/2002 | Patwari et al. | 342/450 |
| 7,269,427 B2 * | 9/2007 | Hoctor et al. | 455/456.2 |
| 2001/0053175 A1 | 12/2001 | Hoctor et al. | |
| 2003/0013146 A1 * | 1/2003 | Werb | 435/9 |

* cited by examiner

| $N_P$ pulse pairs separated by time $D_1$ with data bit $B_1$ | $N_P$ pulse pairs separated by time $D_2$ with data bit $B_2$ | ⋯ | $N_P$ pulse pairs separated by time $D_{(Nc-1)}$ with data bit $B_{(Nc-1)}$ | $N_P$ pulse pairs separated by time $D_{Nc}$ with data bit $B_{Nc}$ |
|---|---|---|---|---|

TRANSMITTER LOCATION FOR ULTRA-WIDEBAND, TRANSMITTED-REFERENCE CDMA COMMUNICATION SYSTEM

CROSS REFERENCE TO RELATED APPLICATIONS

The subject matter of this application is related to non-provisional patent application Ser. No. 09/753,443 for "Ultra-Wideband Communication System", assigned to the assignee of this application. This application is a continuation-in-part of U.S. patent application Ser. No. 09/973,140 filed Oct. 9, 2001 now U.S. Pat. No. 7,269,427, for "TRANSMITTER LOCATION FOR ULTRA-WIDEBAND, TRANSMITTED-REFERENCE CDMA COMMUNICATION SYSTEM," which is hereby incorporated by reference herein in its entirety.

STATEMENT REGARDING FEDERALLY SPONSORED RESEARCH & DEVELOPMENT

The U.S. Government may have certain rights in this invention pursuant to the National Institute of Standards and Technology Contract Number 70ANB0H3035 awarded by NIST.

BACKGROUND OF THE INVENTION

Various embodiments of the present invention relate to the use of ultra-wideband (UWB) radio communication systems. In particular, the various embodiments pertain to a transmitted-reference, delayed hopped (TR/DH) UWB radio communications system for use in an asset tracking system.

Wireless, narrowband or conventional spread-spectrum communications systems have been proposed for tracking objects within an area of interest. Some of these systems are bi-directional and operate via polling. Others are one-way and transmit based on movement of an asset tag (a small transmitter attached to an item to be tracked) or according to some predetermined schedule that is independent of environmental conditions. Still other systems track objects based on time-difference-of-arrival (TDOA) information or by using crude field-strength measurements. In addition to their tracking function, such systems have been used to provide discrete status information which, for example, may indicate whether a device is powered on.

While narrowband and spread-spectrum systems have proven useful, they are not without drawbacks. For example, the performance of such systems may be adversely affected by interference from strong local RF emitters. The opposite is also true; i.e., because their transmitted energy is concentrated in a relatively limited spectrum, narrowband and conventional spread-spectrum systems may interfere with sensitive communications equipment located within or even external to the operating region.

Narrowband or spread-spectrum systems have also demonstrated poor performance in urban areas, or areas where there is a high concentration of electromagnetic interference. For example, such transmissions are often unable to penetrate building components (e.g., walls, steel structures, elevator shafts, etc.), thereby making their use impracticable in many cases. In addition, narrowband systems often require large power margins in order to combat significant frequency-selective fading, which is associated with indoor RF transmissions.

Time-Difference-of-Arrival (TDOA) is one method that is used to estimate the point of origin of a transmission observed at several receivers. In this method, each receiver accesses a global clock or timebase so that local Time-of-Arrival (TOA) estimates made at the individual receivers can be compared. An observed difference in TOA at two receivers of known location defines a hyperbola on the plane containing the two receivers and the transmitter. Because the location of the application described here is indoors, the range of values taken by the height of the transmitter off the floor is limited. This being the case, one can approximate the problem by treating all receivers and all asset tags as though they lie in the same plane.

Because the TOA estimates from the various receivers will contain errors, the curves defined by pairwise differences of all receiver measurements will not necessarily intersect. Various procedures can be defined to develop a location estimate from such data. Perhaps the simplest of these is to pick the point on the plane that minimizes the sum of the normal distances from the point to all of the hyperbolas defined by the TDOA measurements. This computation typically takes place at a central computer, which communicates with the RF receivers, typically over a secondary wired network.

The secondary wired network is also used to distribute the global timebase to all the receivers in the system, which uses bandwidth on the wired network as well as extra hardware at the receivers. The use of extra bandwidth on the secondary wired network is a drawback, because it contributes substantially to the system cost.

To exemplify, U.S. Pat. No. 5,119,104 notably describes a conventional spread-spectrum system which operates by distributing a clock to a plurality of receivers in a tracking environment, and which then uses that clock to gate a time-of-arrival (TOA) count within each of a plurality of receivers. The TOA count is used to estimate the RF propagation distance between a transmitting tag and the receiver. To maintain ranging accuracy, the system clock typically should have very little skew between the receivers because each 1 ns of clock skew could introduce as much as 1 foot of ranging error in the system. Clock skew is easily introduced when the system clock is distributed with a cable. Therefore, cable lengths are carefully measured or controlled during installation of the system, and calibrations are made in the system to account for the different clock skews introduced by the cabling. This increases system cost and complicates installation as well as maintenance and repair of the system.

In view of the foregoing, it would be desirable to provide an asset tracking system which overcomes the drawbacks of the conventional narrowband and spread-spectrum systems, and more specifically one which operates more reliably and economically regardless of environmental conditions and without the cost of providing a single clock to all receivers in the system.

BRIEF DESCRIPTION OF THE INVENTION

In accordance with one embodiment, a method for determining a location of an object within an area of interest includes transmitting wireless signals from a plurality of objects to at least three receivers, calculating, at each of the at least three receivers, time difference of arrival information based on the wireless signals, and determining a location of at least one of the objects within the area of interest based on the time difference of arrival information.

In accordance with another embodiment, a system for determining a location of an object within an area of interest includes a mobile device carried by each of a plurality of objects with the mobile device including a transmitter for transmitting a wireless signal. The system also includes at least three base stations within the area of interest, with each of the at least three base stations having a detector for detecting the wireless signals transmitted from a plurality of mobile devices. Each of the base stations also includes a processor for deriving time difference of arrival information based on the wireless signals. The system also includes a controller for determining the location of at least one of the objects within the area of interest based on the time difference of arrival information calculated by each of the three base stations.

DETAILED DESCRIPTION OF THE INVENTION

Figure 1:
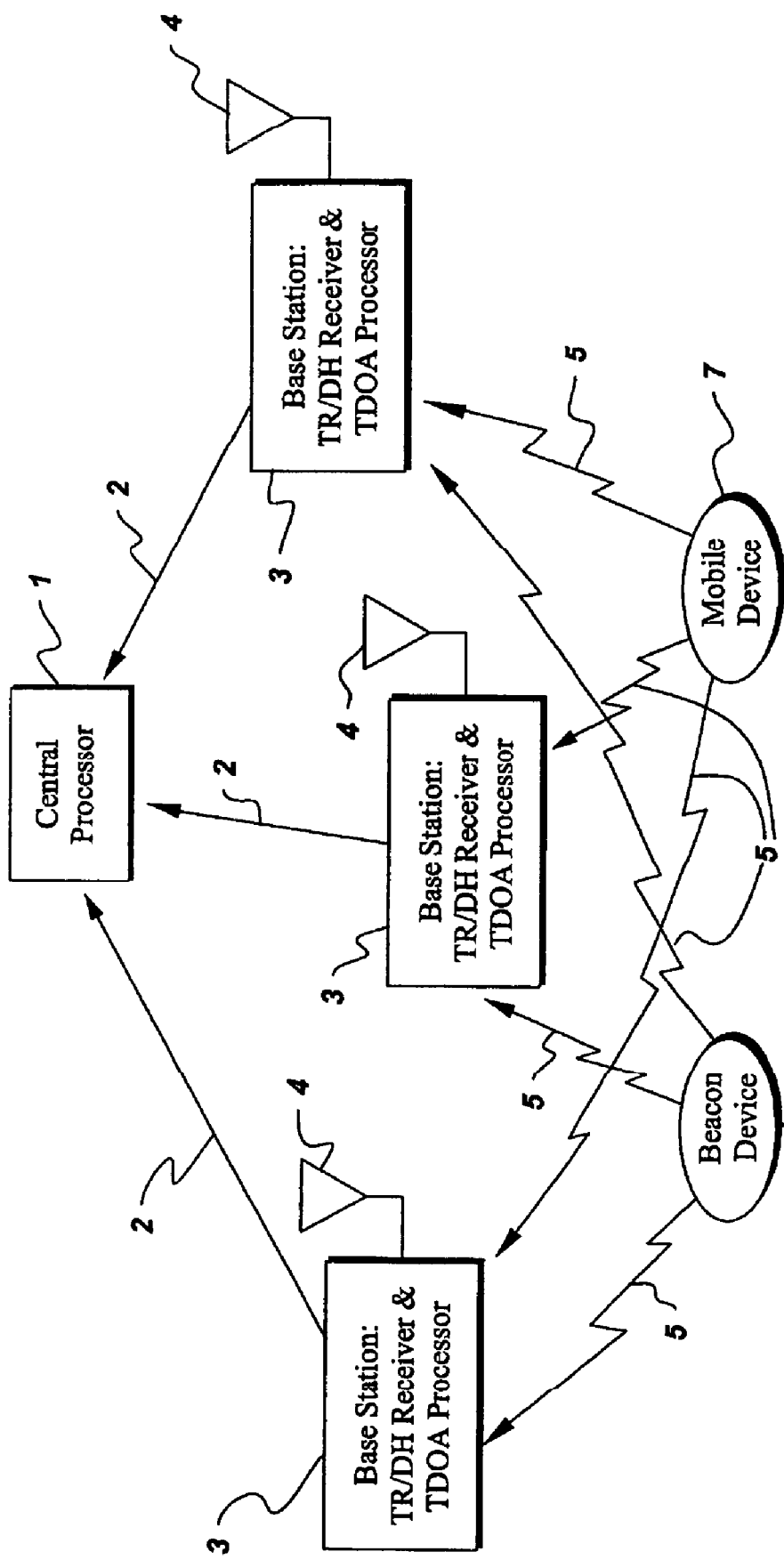
FIG. 1 is a diagram showing an area of interest in which various embodiments of a system of the present invention may be used.

Referring to FIG. 1, an exemplary embodiment of a communications system of the present invention includes a central processor 1 which communicates via low-bandwidth communications channel 2 to at least three base stations 3. The base stations 3 are equipped with antennas 4 for receiving TR-UWB transmissions from one or more beacon devices 6 and/or one or more mobile devices 7, all of which are located within an area of interest. The area of interest may lie entirely within or include a medical facility, such as a hospital, to allow the base station 3 to track the location of medical assets and/or patients, and if desired to receive physiological data from those patients. While embodiments of the present invention are well suited for the hospital setting, those skilled in the art can appreciate that the area of interest may be any other area in which objects may be tracked or monitored, including day care centers for tracking children, warehouses for tracking inventory, mobile platforms for tracking development in a manufacturing process, and construction sites for tracking tools, workers, and/or materials, to name a few.

The mobile devices 7 (e.g., mobile radio devices) of the system are equipped with transmitters for sending inbound burst signals 5 (e.g., RF signals) to the base station 3. The receiver of the base station 3 receives signals from the mobile devices 7 and/or signals from the beacon transmitters (e.g., beacon signals from transmitters of the beacon devices 6), if used, and communicates differences in times of arrival to the central processor 1, which uses the data to determine the locations of the mobile devices 7. The inbound burst transmissions are identified to the base station 3 by means of unique identifying information encoded in the RF burst. This identifying information may be, for example, a serial number or other ID number. The RF burst comprises, at a minimum, the identifying information, plus other header and error control fields used to provide reliable reception. Such methods of framing data transmitted over a noisy communications channel are well-known in the communications arts; see, for example, Hershey and Yarlagadda, *Data Transportation and Protection,* Plenum Press, 1986.

It should be noted that while various embodiments of the present invention are described using RF transmissions, they are not so limited. Various embodiments of the present invention may be implemented using any type of wireless communication and signals, including, but not limited to using wireless communications providing RF, ultrasound, magnetic radiation, acoustic radiation, and modulated magnetic signals, among others. Thus, when reference is made to wireless communication, this refers to any type or kind of communication provided without the use of wires.

In order to allow for a reasonable number of asset tags and beacon devices 6 to be active simultaneously, exemplary embodiments of the system of the present invention employ code-division multiple-access (CDMA) technology capable of supporting approximately 50 to 100 simultaneous transmitters, each at 1 to 5 Kbits/sec with bit error rate of less than $10^3$. Advantageously, transmitted-reference, delay-hopped ultra-wideband (TR/DH-UWB) communications technology is capable of providing the aforementioned performance. An in-depth description of a TR/DH-UWB technology is described in co-pending U.S. patent application Ser. No. 09/753,443. A description of this system is provided below.

Signal Transmission/Detection Scheme

In its most basic form, a transmitted-reference communications system transmits two versions of a wideband carrier, one modulated by data and the other unmodulated. See, for example, Simon et al., *Spread Spectrum Communications,* Vol. 1, Computer Science Press, 1985. These two signals are recovered by a receiver and then are correlated with one another to detect the modulating data. The commonly used wideband carrier is a continuous, wideband pseudo-noise source, and the modulated and unmodulated versions are typically separated from one another in either time or frequency.

In the exemplary embodiment, the transmitted carriers may be either RF pulses; continuous, wideband noise; or continuous, wideband pseudo-noise. As used herein, the term "transmitted-reference" refers to the transmission and reception of any of these wideband waveforms as the carrier of a transmitted-reference signal. The separation between the modulated and reference versions of the waveform may take place in time, rather than frequency. The receiver correlates the received signal with a delayed version of itself over a finite interval to demodulate the signal.

Figure 2:
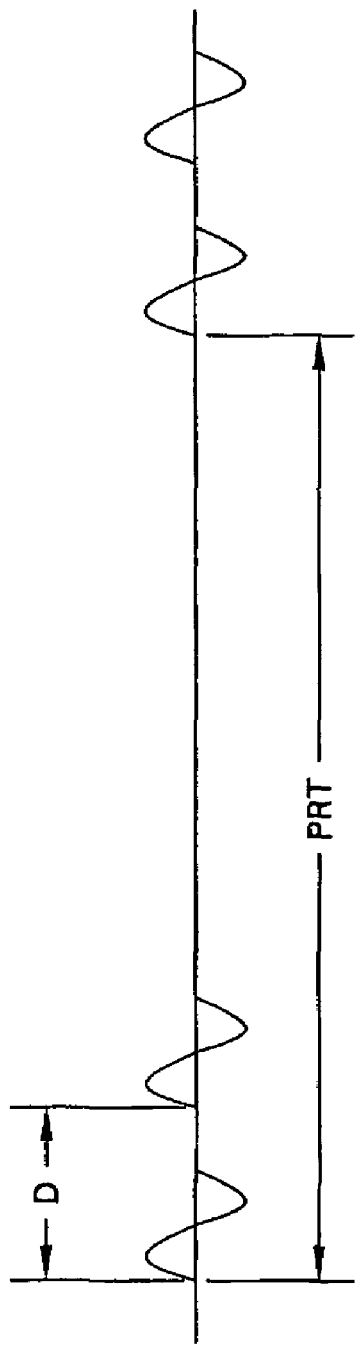
FIG. 2 is a diagram showing pulse pairs transmitted in a TR-UWB signal in accordance with exemplary embodiments of the present invention.

FIG. 2 shows a signaling scheme for TR/DH-UWB signals in accordance with the exemplary embodiment. As shown, a TR/DH-UWB scheme may be implemented by transmitting pairs of identical pulses (called doublets) separated by a time interval D, known to both the base station receiver and the mobile device transmitter. The transmitted data is encoded by the relative amplitude polarity of the two pulses. In FIG. 2, both pulses are shown to have the same polarity. More than one doublet may be associated with each information bit, as long as all the associated doublets have the same time interval D between pulses. This would be advantageous if the peak power of the individual pulses is near or below the noise floor; in this case multiple doublets can be integrated to improve the signal-to-noise ratio. The time over which all the transmitted doublets pertain to the same bit is known as the bit time, or in the context of the delay-hopping scheme discussed below, the chip time.

The doublets need not be transmitted at a regular rate. The interval between doublets, called the pulse repetition time (PRT), may be varied in order to shape the spectrum of the transmission. The pulse repetition time (PRT) is depicted in FIG. 2. Because a uniform PRT would result in undesirable line components in the spectrum, the PRT may be (but is in no way restricted to be) randomized. In addition, individual pulses in a doublet can be shaped in such a way as to concentrate their energy in certain frequency bands. The above methods can also be used to accommodate various spectrum restrictions.

Figure 3:
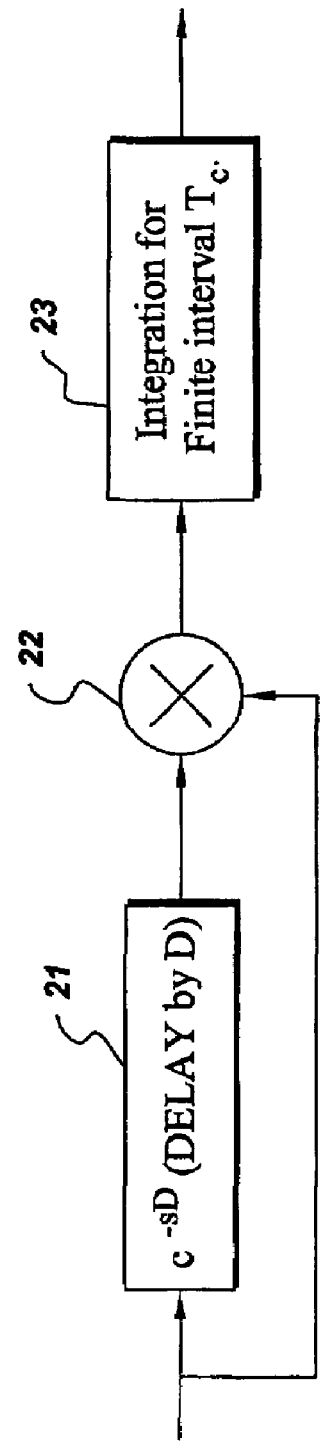
FIG. 3 is a diagram of a correlator circuit used to detect a TR-UWB signal in accordance with exemplary embodiments of the present invention.

At the receiver, for each RF-pulsed-based, transmitted-reference signal received, encoded information is recovered from a doublet by computing the correlation at a lag given by D. This operation is performed by an electronic circuit called a pulse-pair correlation circuit, a block diagram of which is shown in FIG. 3. This circuit includes a delay 21, a signal multiplier 22 and a finite-time integrator 23. The signal is split into two paths, one of which is delayed by delay 21. The two versions of the received signal are multiplied in multiplier 22, and the product is integrated over a specified time, $T_c$, by integrator 23. The integration time is determined by the number of doublets making up the transmitted bit or chip. The delay is such that the leading pulse of the delayed circuit path is registered in time with the trailing pulse of the undelayed circuit path. This non-zero-mean product is integrated over a symbol interval, $T_c$, to produce an output signal. In an exemplary embodiment, delay 21 may be a circuit fabricated by Micro-Coax in Pottstown, Pa., and a suitable candidate for signal multiplier 22 may be a four-quadrant Gilbert cell.

Note that, in practice, the output of the finite-time integrator is used at some relatively small number of sampling instants. Therefore, the continuously-integrating finite impulse response (FIR) integrator can be replaced by several simple integrate-and-dump circuits, which are sampled in a round-robin fashion by the A/D converter and are dumped by the same clock that triggers the sampling.

A pulse-pair correlation circuit can have more than a single delay, wherein multiple delays have nominal values spread around the nominal value of the transmitter's delay. The delay actually used for demodulation may be chosen from among the existing delays as that one whose energy output has the highest energy in response to a transmission at the nominal delay. Naturally, this selection can be varied to account for drift in the delay value at the transmitter or receiver caused by temperature, voltage or component aging induced variations. The selection may be different for different transmitters.

In accordance with an exemplary embodiment, the mobile devices 7 transmit TR-UWB signals according to a type of multiple access scheme referred to herein as delay hopping (DH). This transmission scheme is described in co-pending U.S. patent application Ser. No. 09/753,443, assigned to the instant assignee.

The term "delay hopping" refers to a multiple access technique that is related to delay modulation in the same way that "frequency hopping" is related to frequency modulation. Specifically, delay-hopping refers to the method of varying the delay used in TR-UWB transmission according to a fixed pattern known to the transmitter and to the receiver. This pattern constitutes a code word, and multiple access capacity is obtained through the code-division multiple access (CDMA) technique. See Andrew J. Viterbi, *CDMA Principles of Spread Spectrum Communication,* Addison-Wesley Publishing Co. (1995). Alternatives to the transmission scheme include the use of more than two pulses to form the TR transmission, inducing variation in the pulse repetition time to shape the transmitted spectrum, and transmission of pulses having designed frequency-domain characteristics.

Figures 4, 5:
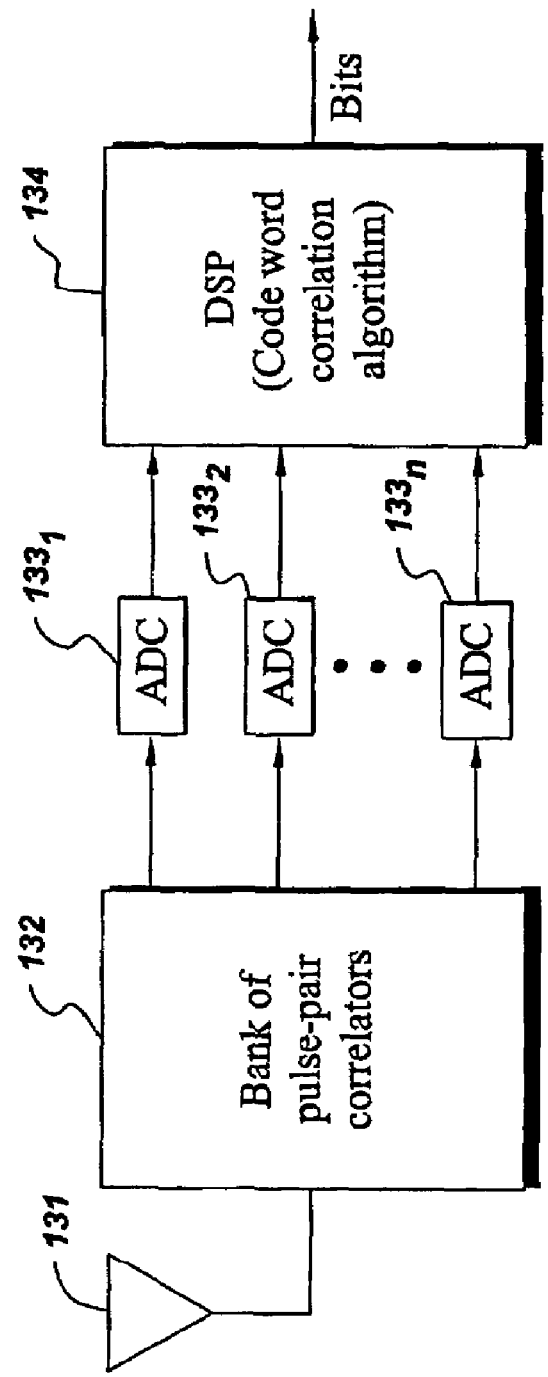
FIG. 4 is a diagram of a structure of a TR/DH code word used to transmit signals from multiple mobile devices in accordance with exemplary embodiments of the present invention.
FIG. 5 is a diagram of a base station receiver which includes a bank of pulse-pair correlators for detecting delay-hopped, transmitted-reference signals from a plurality of mobile devices in accordance with exemplary embodiments of the present invention.

On the signal level, a TR/DH code word includes N chips, transmitted sequentially. Each chip includes $N_p$ doublets (or other n-tuples), all receivable with the same pulse-pair correlation circuit. Doublets transmitted in different chip intervals are, in general, characterized by different delays. The PRT within a given chip interval varies randomly about some nominal or average pulse repetition time. The structure of the TR/DH code word is depicted in FIG. 4.

Each chip comprises $N_p$ pulse pairs separated by interpulse delay $D_i$, with code word polarity bit $B_i$, i=1, 2, . . . , $N_c$, where $N_c$ is the number of chips in the code word. Note that the chip values are distinct both in associated delay value and in the polarity of the transmitted chip (±1), because the individual pulses of any pulse pair can be transmitted either in-phase or out-of-phase, yielding either a positive or negative output from the pulse-pair correlator. When a code word of $N_c$ chips is used to send a single data bit, the entire code word may be negated on a chip-by-chip basis to represent one bit polarity, while the original code word is used to represent the other bit polarity. Naturally, it is also possible to represent different data values with completely different code words. If the data bit to be sent is zero, then all doublets in each chip of the code word are transmitted with the opposite polarity of the code word polarity bit.

The DH code words are part of the delay-hopped code division multiple access (CDMA) scheme. They can be constructed at the time of system design using computer search for words with desirable correlation properties. At the time of operation of the system, these words are known to the receiver and they are used to detect the transmitted bits. In one example, a set of 1000 code words is generated, each comprised of 200 chips, with delays drawn from a set of 16 possible delays. All of these code words had auto-correlation side lobes that are less than 7% of the peak auto-correlation in absolute value. The maximum of the absolute value of the cross-correlation at any lag between any pair of these words is less than 10% of the peak auto-correlation. Longer codes, comprised of more chips, will have even better correlation properties.

Exemplary embodiments of the system of the present invention track multiple mobile devices 7 within the area of interest based on TR/DH-UWB signals transmitted from the mobile devices 7. The base station receiver is configured to receive and demodulate these signals simultaneously, by applying separate correlator circuits, each associated with a separate delay-hopping CDMA code.

FIG. 5 shows one possible configuration for the base station receiver for detecting TR-DH signals. This receiver includes a bank of pulse-pair correlators 132 connected to antenna 131. Each correlation in the bank of pulse-pair correlators is tuned to a different delay. The bank of pulse-pair correlators is followed by a CDMA code word correlation. The code word correlation is implemented as software running on a digital signal processor (DSP) 134, programmable logic device (PLD), or application-specific integrated circuit (ASIC). The outputs of all of the correlators are sampled by analog-to-digital converters (ADCs) $133_1$ to $133_N$, and the digital data is transferred into the DSP 134. A typical sample rate for these ADCs is in the range of 2 Msps to 12 Msps. This rate is determined by the chip time. In general, it is desirable to have two or more samples per chip.

Figure 6:
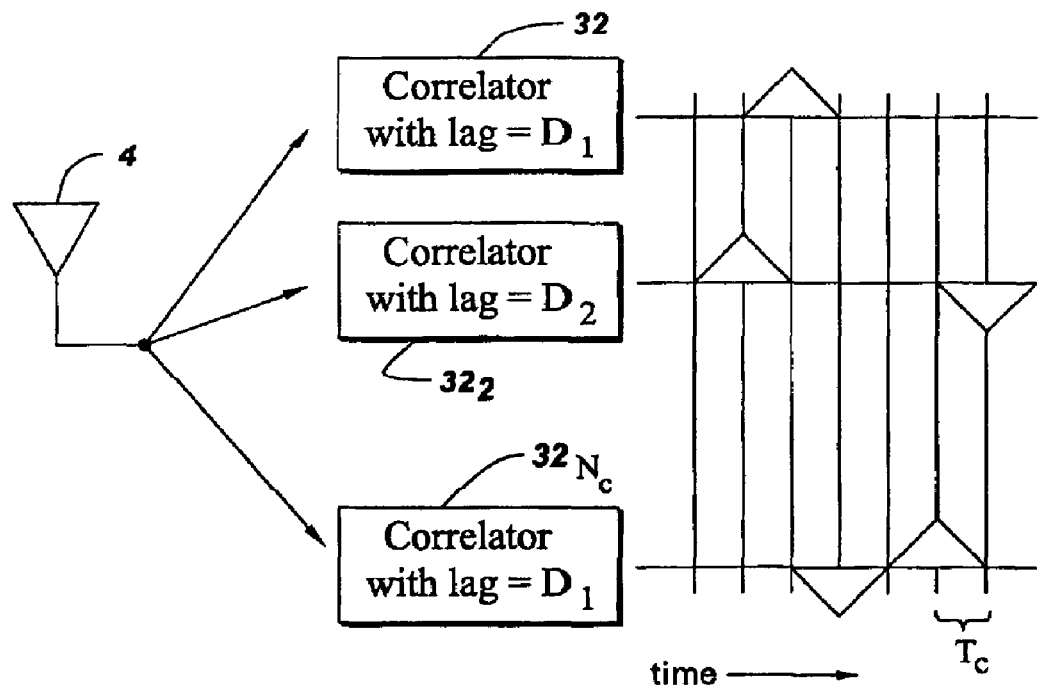
FIG. 6 is a diagram of a first stage of the UWB transmitted reference, delay-hopped (TR/DH) code division multiple access (CDMA) receiver included in a base station in accordance with exemplary embodiments of the present invention.

The chip signals at the outputs of the bank of pulse-pair correlators are characteristically peaked as shown in FIG. 6. These signals are of duration approximately equal to twice the integration time of the pulse-pair correlators. This set of waveforms will be sampled at a rate yielding, typically, 2 to 5 samples per chip period, and then sent to the delay-hopped code word detector implemented in the DSP 134. The DH code detector algorithm will take samples of the multiple outputs of the bank of pulse-pair correlators and add them together in a manner dictated by the expected DH code word.

This operation produces the registered sum of all the chip signals. When the expected code word matches the transmitted code word, this operation will have the effect of applying a gating waveform, matched to the entire DH code word waveform, to the observed data. If the gating waveform matches the shape of the chip signal waveform, a matched filter is implemented; however, knowledge of the relative timing of the receiver sample clock and the transmitter chip clock is determined. This knowledge can be derived from the received data, as described below.

Specifically, if $N_s$, is the number of samples per chip (an integer), then the total number of sample times over which code word detection is performed is $N_s$ times $N_c$. If $N_d$ is the number of different intrapulse-pair delays used by the code (and therefore the number of pulse pair correlators in the receiver), then the total number of samples to be retained for correlation is $N_s$ times $N_c$ times $N_d$. Of these samples, only those delays matching the delay specified by the structure of the code word should be added. Because the number of samples in each chip interval is specified to be an integer, the number of samples in each pulse-pair correlation output waveform is an integer. Furthermore, the samples of each of the pulse-pair correlation output waveforms have the same relationship to the start times of the chips for all the waveforms, so that they can be added up coherently, given a knowledge of the transmitted code word.

A schematic representation of the bank of correlators and its output waveforms, referred to herein as chip waveforms, is given in FIG. 6. The antenna 4 provides inputs to correlators $32_1$ to $32_{N_C}$ that include the bank of pulse-pair correlators 132 in FIG. 5. To make the code correlation idea more concrete, an example follows.

Figure 7:
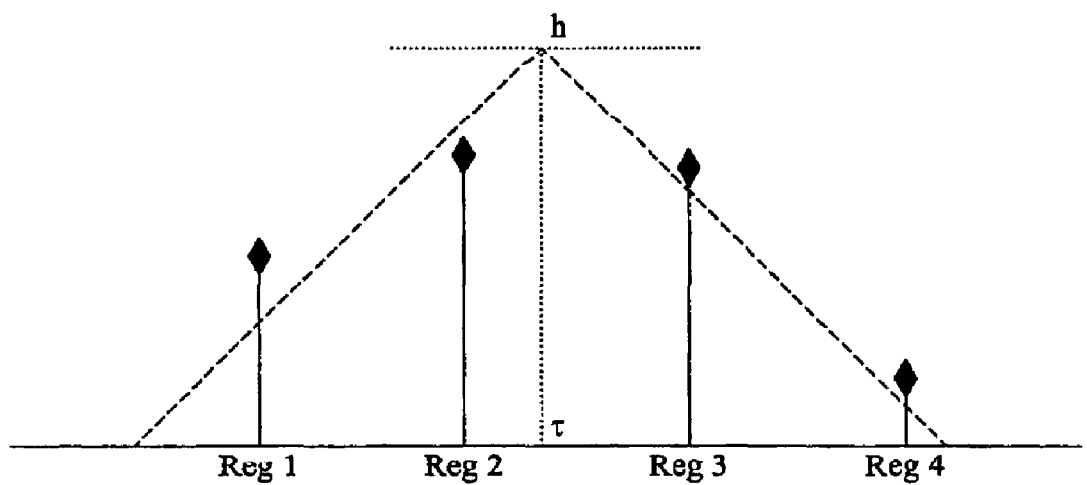
FIG. 7 is a diagram of a computational set-up for the code-word correlation performed by the delay-hopped CDMA receiver of FIG. 6.

Consider the receiver chip waveforms of FIG. 7. As an example, specify the number of delays as $N_d$=3 and the code word length as $N_c$=5, and consider the depicted set of pulse pair correlation output waveforms as representing a complete code word. This code word could be denoted by a sequence of delay indices and code word polarity bits: (2,1; 3,−1; 1,1; 3,1; 2,−1). The first chip of the code word has been specified to be expected on delay number 2 and will convey a transmitted bit value of +1; the second chip has delay value number 3 and bit value of −1, and so on. Assume that there are $N_s$=2 samples during each chip interval on each delay channel (each pulse pair correlation output). These samples are separated by $T_c/2$, where $T_c$ is the chip interval duration.

Thus, there are four samples for each waveform and each waveform is sampled at the same times relative to its own starting time. The four samples may be accumulated in 4 corresponding registers. The samples are collected three at a time, with all samples collected simultaneously. The four samples from each waveform could be transferred into the DSP 134 and multiplied by the expected chip values and the products added together, producing a sampled correlation output waveform at a much higher signal-to-noise ratio (SNR). The set of expected chip values includes zero, which is applied to combinations of delay channels and chip times not included in the code word.

Assume this result is computed at the time instant depicted in FIG. 7, assuming that the DSP 134 is correlating with the DH code word that has just been fully received. The oldest (leftmost) set of three input data samples available to the DSP would have a positive value on channel 2, and zeros on channels 1 and 3. The algorithm would multiply the value on channel 2 by 1, because the first chip is positive, and add the product to the first of four registers that had been initialized to zero. The second set of three samples includes a larger value for channel 2, but also has zeros in channels 1 and 3. The algorithm adds the new value to register 2. The third set of samples contains non-zero data on both channels two and three. The data on channel three is negative-valued, but the second chip of the desired code word is also negative, so multiplication by the gating waveform negates the negative value, and a positive number is added to register 1. The positive value on channel 2 is multiplied by 1 and added to register 3. This process continues in the manner just described until all the samples in the code word are accumulated. In general, at each sample time, two non-zero samples will be added into two separate registers. The result of this process is depicted in FIG. 7, for the case where the expected code word has just been received and the transmitted bit value is +1. The values plotted are the final values of the four registers.

Once the output samples of the code word correlation (represented by black diamonds in FIG. 7) have been formed in the DSP 134, the receiver decides if a code word has been received during the last sample interval. This decision is to be made by comparing the energy in the compounded, received samples to a threshold. If this decision is positive, other data is derived from the samples. In the data transmission application of TR/DH, the code word would be modulated by a ±1, which would represent the transmitted information.

One way to estimate this value is to fit a model of the pulse-pair correlation output waveform to the samples at the output of the code word generator. Such a fit could be done on the basis of minimum squared error, which would result in the optimum fit for Gaussian observation noise. It can be demonstrated that the observation noise is Gaussian. The possible result of this algorithm is shown in FIG. 7, superimposed over the sample values. The fitted model is controlled by two parameters, the amplitude, or height, h, and the location of the peak, Θ. This information can be supplemented by the sum of squared errors for the best fit whose peak value is within the current sample interval. The absolute value of the peak value and the sum of squared errors can be combined and compared to a threshold to detect the code word. The value of τ can be used as an estimate of the timing phase of the code word. The sign of the estimated value of h can be used to detect the transmitted bit value.

When the receiver is looking for a TR-DH code word without any prior synchronization information, the algorithm just described is executed for each new set of samples, that is, at the end of each sample interval. When the receiver is receiving a sequence of TR/DH symbols, only samples close to the expected time of the next bit are processed. An alternative method of bit detection for the data transmission application would be a matched filter applied to the output of the code word correlation. In this method, an estimate of the value of τ is determined, which could be obtained and refined by standard methods, such as the well-known early/late gate scheme as described by J. G. Proakis in *Digital Communications*, 3d Ed., McGraw-Hill, 1995, for example. Application of this scheme to various embodiments of the present invention would involve the interpolation of two waveform values from the data in the registers labeled in FIG. 7. These values would be early and late gates spaced symmetrically around the peak at τ.

Figure 8:
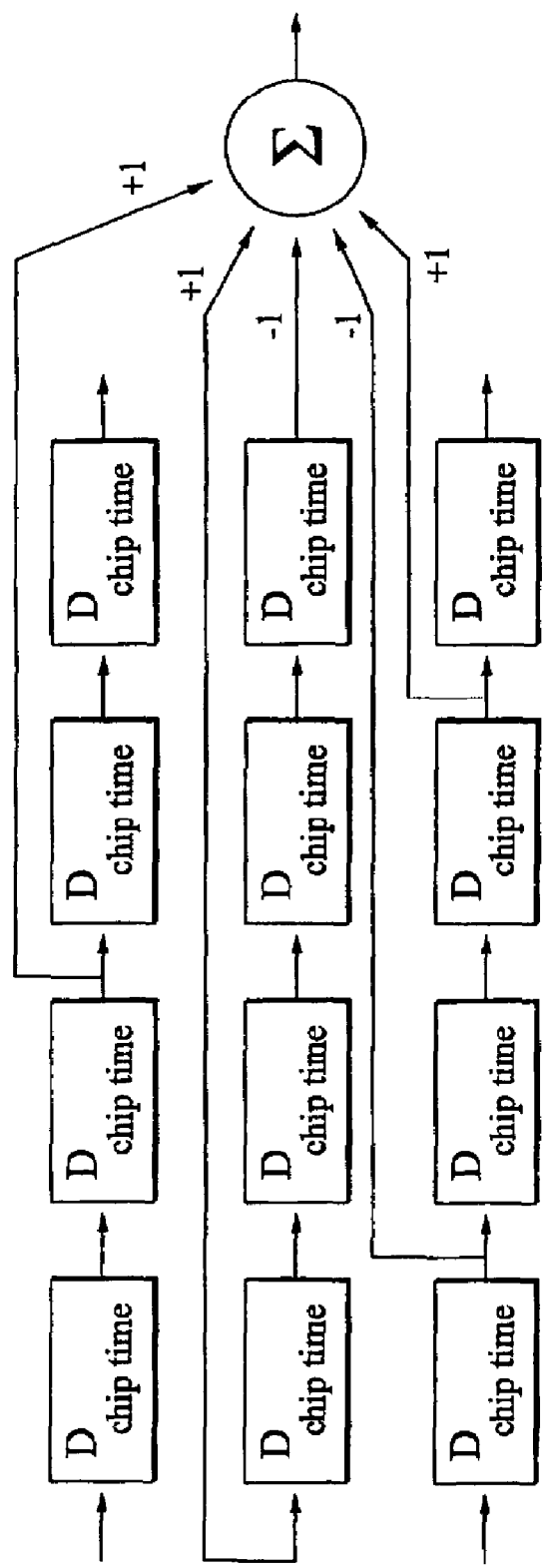
FIG. 8 illustrates a correlator for the delay-hopping UWB transmission illustrated in FIG. 6.

A CDMA code correlator is used to gather all of the elementary correlator outputs together in time and add them together with proper polarity. FIG. 8 depicts a hardware CDMA code correlator that does this for the elementary correlator outputs sketched in FIG. 6. Note that the chip time delays and signs (additions and subtractions) cause the elementary correlator peaks to be aligned in time with the same signs. Because the sample period of the A/D converters has been specified to be a fraction of the chip period, the delays in FIG. 8 may all be implemented as a number of digital storage devices, with provision for passing stored data from one to the next. Thus, FIG. 8 depicts a synchronous digital circuit such as would be implemented in a programmable logic device or ASIC.

The foregoing operations cause a large signed output at a UWB bit time. The sign of the large output is interpreted as the binary value of the UWB bit transmission. A set of CDMA code correlators is referred to as a CDMA correlator bank (CCB).

Time of Arrival Estimation

Described hereinabove is how the timing phase of received bits can be estimated. The same procedure can be used to establish a difference of times of arrival relative to a local clock. The parameter τ produced by the algorithm, described above and depicted in FIG. 7, identifies the time at which the detected bit arrived relative to the sample clock. That is, τ is an estimate of the time between the end of the last transmitted chip and that "tick" of the sample clock that is closest to it. This time interval can be added to a specific time related to the processing, such as the time of the last sample that contributed to the estimate of τ. This sum identifies a specific time, relative to the sample clock, which is related to the time of arrival. The local time marker formed in this way can be compared to any other such estimate, derived for a separate transmission in the same way, and with respect to the same local clock or with respect to a clock synchronized to the local clock. The two estimated parameters will both bear the same relationship to the true times of arrival of the two transmissions, and their difference will be the actual difference in time of arrival of the two transmissions. These computed differences in arrival times can in turn be used to estimate locations of transmitters when combined with similar data from other receivers, as described below.

The following steps are used to estimate the time markers from which the difference in times of arrival of two transmissions can be estimated.

1. The transmitter sends a burst of TR/DH-UWB modulated information. The time of this transmission is determined by clock circuitry internal to the asset tag and is unknown to the receiver.

2. The receiver processes the output samples of the bank of pulse-pair correlators, as depicted in FIG. 5. For each new set of ADC samples, the DSP circuit performs the CDMA code word correlation operation, and attempts to detect the presence of an RF burst by correlating the output of the CDMA correlator with a known burst header, or identifying bit pattern.

3. After the RF burst is detected, the value of the parameter τ is estimated. Note that this value will lie in an interval between samples that are taken after the detection occurs. As each new set of ADC samples is processed by the CDMA code correlator, a new estimate of τ can be produced. Associated with each such estimate is a value of the sum of squared errors for the fit of the model, and the estimate with the lowest model fitting error is chosen from some fixed number of sample periods following the RF burst detection.

4. The value of τ, expressed as a fraction of a sample interval, and the index of the last sample to enter the CDMA code correlator, are saved for each transmission, along with a unique identifier derived from the transmission that identifies the device that originated the transmission.

The difference between the times of arrival of two transmissions is computed by taking the difference:

$$TOA\ difference = (\tau_1 + sample\_index_1) - (\tau_2 + sample\_index_2),$$

where the subscript refers to which of the received transmissions is being used to provide information.

In the time-of-arrival estimation method described above, what is actually measured is the time of the peak of the first chip signal of the packet. This peak represents the time at which pulse-pairs separated by a certain lag stop arriving. If all the mobile devices 7 observe only a direct-path transmission from the transmitter, then the time-difference of-arrival values will give very accurate information about the relative distances between the receiver and the two transmitters involved. That is, the time-difference-of-arrival value will accurately represent the sum of two components: first, the difference between the direct-path propagation times from the two transmitters to the receiver and, second, the difference in times of transmission of the two transmitters.

On the other hand, any multipath will tend to spread out (in time) the peaks of the chip signals, which will have the effect of delaying the detected times of arrival relative to the direct path times of arrival. This delay is likely to be on the order of 10 to 50 ns for an indoor environment resembling an office building. (See Saunders et al., *Antennas and Propagation for Wireless Communication Systems*, John Wiley & Sons, 1999.) This delay translates into an equivalent range error of 50 feet at maximum (30 feet on average). Although this seems large, simulations show that, using the location method described below with four receivers and 15 beacon devices 6, all well-placed with respect to the transmitter, the final location error is on the order of six feet. The effect of "bad" receiver placement varies with the specific configuration but it is possible that large errors in location estimation may result. In general, enough receivers and beacon devices 6 are deployed so that every possible tag location is covered from a large number of angles. Also, there will always be individual cases where the effect of a particular multipath situation will cause an unusually large error.

Another potential source of inaccuracy in the TOA estimate is clock mismatch between the transmitter's chip clock and the receiver's sample clock. Such a mismatch has the effect of shifting the locations of the samples on the waveforms that emerge from the pulse-pair integrators. Over the course of the reception of a bit, this precession of the phase of the sample clock with respect to the phase of the received waveform has the effect of smearing out the waveform in time. For example, if the transmitted bit is 400 microseconds long, and the transmit and receive clock frequencies are mismatched by 10 PPM, then the composite waveform at the output of the CDMA code correlator will be smeared by 4 nanoseconds. The expected value of the resulting TOA estimation error would be half that value. Unlike multipath, which produces only over-estimation errors, this precession in clock frequencies may result in either over- or under-estimation of the TOA. Those skilled in the art will appreciate that the maximum clock mismatch is determined by the stability of the oscillators used to produce the transmit and receive clock waveforms. The maximum clock frequency mismatch and the allowable error due to it will determine the maximum length of a bit that may be coherently combined to form a TOA estimate. The bit length directly influences the detection probability, and therefore the maximum transmission range. Such design trade-offs can be made by one skilled in the art.

Tracking and Asset Monitoring

According to an exemplary embodiment, the system and method of the present invention tracks the location of patients and/or medical assets within a hospital environment. In performing this tracking function, the mobile devices 7 transmit TR-UWB or TR-DH UWB signals to the base station 3, and the base station 3 detects and processes these signals to determine the locations of the mobile devices 7 within the area of interest.

Assume that the transmissions from a set of N transmitters can be received at R receivers. In practice, R might be in the range from 3 to 7 and N might be 10 or more. The absolute time of arrival of the $j^{th}$ transmitter's transmission at the $i^{th}$ receiver is defined by:

$$t_{i,j} = T_j + \frac{d_{i,j}}{c} + X_{i,j}, \quad (1)$$

for receivers i=1, . . . ,R and transmitters j=1, . . . ,N. The random variables $X_{ij}$ represent errors in the TOA measurements relative to the local clock, and $X_{ij}$ and $X_{lk}$ are independent for j≠k or i≠l. The mean of these variables is denoted as μ and their variance as σs². $T_j$ is defined to be the unknown transmission time of the $i^{th}$ transmitter. The quantity c is the speed of propagation and the quantity $d_{ij}$ is the distance from the $j^{th}$ transmitter to the $i^{th}$ receiver.

The quantity given by Equation (1) is recorded relative to the local clock at the $i^{th}$ receiver. Because the assumption is made that the local clocks at the R receivers are not synchronized, the measured quantity $t_{i,j}$ cannot be compared or used in the same computation with the measured quantity $t_{k,j}$ from some other receiver. However, the assumption is made that the clocks at the various receivers are accurate enough in frequency so that measured time intervals from different receivers can be compared. Thus, from the quantities in Equation (1), the measured differences in times of arrival are defined as:

$$\delta_{i,j,k} = (t_{i,j} - t_{i,k}) = \frac{d_{i,j} - d_{i,k}}{c} + (X_{i,j} - X_{i,k}) + (T_j - T_k) \quad (2)$$

where $(T_j - T_k)$ is the difference in transmission time between the $j_{th}$ transmitter and the $k^{th}$, and the remaining symbols are defined as in Equation (1).

The computation of the difference of Equation (2) can be performed locally at each receiver, and expressed as an interval measured by a local clock of limited stability. The values $\delta_{i,j,k}$ and $\delta_{n,j,k}$ from different receivers can then be compared.

With respect to defining a vector of measurements and an associated vector of differences, the vector of measured times-of-arrival at the $i_{th}$ receiver is defined as follows:

$$t_i = \begin{bmatrix} t_{i,1} \\ t_{i,2} \\ \vdots \\ t_{i,N} \end{bmatrix} = \begin{bmatrix} X_{i,1} + \frac{d_{i,1}}{c} + T_1 \\ X_{i,2} + \frac{d_{i,2}}{c} + T_2 \\ \vdots \\ X_{i,N} + \frac{d_{i,N}}{c} + T_N \end{bmatrix} \quad (3)$$

and the vector of computed time differences defined by Equation (2) is defined as:

$$\delta_i = \begin{bmatrix} \delta_{i,1} \\ \delta_{i,2} \\ \vdots \\ \delta_{i,M} \end{bmatrix} = \begin{bmatrix} t_{i,2} - t_{i,1} \\ t_{i,3} - t_{i,2} \\ \vdots \\ t_{i,N} - t_{i,N-1} \end{bmatrix} = \Phi \begin{bmatrix} X_{i,1} + \frac{d_{i,1}}{c} + T_1 \\ X_{i,2} + \frac{d_{i,2}}{c} + T_2 \\ \vdots \\ X_{i,N} + \frac{d_{i,N}}{c} + T_N \end{bmatrix} \quad (4)$$

where Φ is an M-by-N incidence matrix, comprised of 1's, 0's and −1's, such that, for 1≦j,k≦N and j>k, the $m^{th}$ row of Φ is comprised of all zeros, except in the $j_{th}$ column, where it has a −1, and in the $k_{th}$ column where it has a +1, with m defined from j and k Such matrices are well known in applied mathematics and graph theory. The matrix Φ is of rank N−1.

Equation (4) is rewritten to separate out the measured data, unknowns and residual errors as:

$$\delta_i = \Phi \begin{bmatrix} X_{i,1} \\ X_{i,2} \\ \vdots \\ X_{i,N} \end{bmatrix} + \Phi \begin{bmatrix} \frac{d_{i,1}}{c} + T_1 \\ \frac{d_{i,2}}{c} + T_2 \\ \vdots \\ \frac{d_{i,N}}{c} + T_N \end{bmatrix} = \Phi Y_i + \Phi \mu_i \quad (5)$$

where the components of $Y_i$ are zero-mean random variables, $X_{ij}$, and $Y_i$ has covariance matrix σ²I, and the vector $\mu_i$ is defined by Equation (5).

The unknown parameters in Equation (5) are the distances from the transmitters to the $i^{th}$ receiver and times of the transmissions. In the standard, cross-receiver form of the TDOA location estimation, the differences in time of transmission are zero, because the differences are of TOA's of a single transmission, and so the transmission time cancels. In various embodiments of the location method of the present invention, when differences between times of arrival of different transmitter's bursts are determined, the transmission times remain a part of the equations. Further, in various embodiments of the method of the present invention, all of the unknown parameters are estimated at once, and the $T_j$'s are treated as nuisance parameters whose estimated values are discarded. The $d_{i,j}$ values in Equation (5) are parameterized using the unknown planar location of the $j^{th}$ transmitter, $(x_j, y_j)$, and the known location of the $i^{th}$ receiver, $(u_i, v_i)$, as follows:

$$d_{i,j} = \sqrt{(x_j - u_i)^2 + (y_j - v_i)^2} \quad (6)$$

and the vector of parameters to be estimated is defined as:

$$\Theta = [x_1, y_1, \ldots, x_N, y_N, T_1, \ldots, T_N]^T \quad (7)$$

Using these definitions, the mean of the data vector, which is defined in Equation (8) below, can be expressed as a function of the unknown quantities:

$$\mu_i(\Theta) = \begin{bmatrix} \frac{\sqrt{(x_1 - u_i)^2 + (y_1 - v_i)^2}}{c} + T_1 \\ \frac{\sqrt{(x_2 - u_i)^2 + (y_2 - v_i)^2}}{c} + T_2 \\ \vdots \\ \frac{\sqrt{(x_N - u_i)^2 + (y_N - v_i)^2}}{c} + T_N \end{bmatrix} \quad (8)$$

Equation (5) the may be solved for $Y_i$. Because $\Phi$ is singular, a reduced incidence matrix is used, and comprised of the $2^d$ through $N^{th}$ columns of $\Phi$. Denoting the reduced incidence matrix as $\Phi_R$, and the first column of $\Phi$ as $\Phi_1$, the incidence matrix is conformally partitioned as: $\Phi = [\Phi_1 \vdots \Phi_R]$, and Equation (5) is expressed as:

$$\delta_i - \Phi \mu_i(\Theta) = \Phi_1 Y_{i,1} + \Phi_R \begin{bmatrix} Y_{i,2} \\ \vdots \\ Y_{i,N} \end{bmatrix} \quad (9)$$

It should be noted that the M-by-(N−1) matrix $\Phi_R$ has full column rank. Next, pre-multiplying both sides by $(\Phi_R^T \Phi_R)^{-1} \Phi_R^T$, where it is noted that the inverse exists because of the rank of $\Phi_R$ the result is:

$$\begin{bmatrix} Y_{i,2} \\ \vdots \\ Y_{i,N} \end{bmatrix} + (\Phi_R^T \Phi_R)^{-1} \Phi_R^T \Phi_1 Y_{i,1} = (\Phi_R^T \Phi_R)^{-1} \Phi_R^T (\delta_i - \Phi \mu_i) \quad (10)$$

Defining the (N−1)-by-1 vector Q as:

$$Q = \begin{bmatrix} q_2 \\ \vdots \\ q_N \end{bmatrix} = (\Phi_R^T \Phi_R)^{-1} \Phi_R^T \Phi_1 \quad (11)$$

and substituting into Equation (10) results in the following:

$$\tilde{Y}_i \triangleq \begin{bmatrix} Y_{i,2} + q_2 Y_{i,1} \\ \vdots \\ Y_{i,N} + q_N Y_{i,1} \end{bmatrix} = (\Phi_R^T \Phi_R)^{-1} \Phi_R^T (\delta_i - \Phi \mu_i) \quad (12)$$

Further, $\tilde{Y}_i$ is a zero-mean random vector with (N−1)-by-(N−1) covariance matrix, which may be determined to be:

$$\Sigma_{\tilde{Y}_i} = E\{\tilde{Y}_i \tilde{Y}_i^T\} = \sigma^2(I + QQ^T) \quad (13)$$

and this covariance matrix is of full rank because it is a scalar multiplied by a rank-one adjustment to the identity matrix: I+$xy^T$ is invertable in case $y^T x \neq -1$, but $Q^T Q = |Q|^2 \geq 0$. If all of the transmitters are received at all of the receivers, and if the data differences are ordered in the same way at all receivers, then all the covariance matrices of the $\tilde{Y}_i$ will be identical. In this case, the receiver subscript is removed from the covariance matrix $$\Sigma_{\tilde{Y}}.$$

The weighted error function to be minimized is the sum of the quadratic forms expressing the squared error for each receiver and defined as:

$$J(\Theta | \delta_1, \delta_2, \ldots, \delta_R) = \sum_{i=1}^{R} \tilde{Y}_i^T \Sigma_{\tilde{Y}}^{-1} \tilde{Y}_i = \sum_{i=1}^{R} (\delta_i - \Phi \mu_i(\Theta))^T \Phi_R (\Phi_R^T \Phi_R)^{-1} \Sigma_{\tilde{Y}}^{-1} (\Phi_R^T \Phi_R)^{-1} \Phi_R^T (\delta_i - \Phi \mu_i(\Theta)) \quad (14)$$

The objective function of Equation (14) can be maximized numerically without pre-computing the gradient by use of the known optimization methods. Such a procedure simply may be a cyclical coordinate search followed, at each iteration, by an extra line search along the line connecting the current solution to the last one.

It should be noted that a faster approach is based on Equation (5). Assume that, at some point in the computation, an estimate of the transmitter locations $(\hat{x}_j, \hat{y}_j)$ were available for j=1,…,N, then Equation (5) could be used to express the $T_j$'s in terms of known quantities and residual errors, as:

$$\Phi \begin{bmatrix} T_1 \\ T_2 \\ \vdots \\ T_N \end{bmatrix} = \delta_i - \Phi \begin{bmatrix} \frac{\hat{d}_{i,1}}{c} \\ \frac{\hat{d}_{i,2}}{c} \\ \vdots \\ \frac{\hat{d}_{i,N}}{c} \end{bmatrix} - \Phi Y_i = D_i - \Phi Y_i \quad (15)$$

for receivers i=1,…,R, where:

$$\hat{d}_{i,j} = \sqrt{(\hat{x}_j - u_i)^2 + (\hat{y}_j - v_i)^2} \quad (16)$$

such that that $D_i$, which is defined by Equation (15), is computable from the $(\hat{x}_j, \hat{y}_j)$.

Averaging the vectors $D_i$ over all R receivers, results in:

$$\overline{D} = \frac{1}{R}\sum_{i=1}^{R} D_i = \Phi\left(\begin{bmatrix} T_1 \\ T_2 \\ \vdots \\ T_N \end{bmatrix} + \frac{1}{R}\sum_{i=1}^{R} Y_i\right) \quad (17)$$

It should be noted that each component of $\overline{D}$ has lower variance than the corresponding component of $D_i$.

The incidence matrix in Equation (17) is of rank N−1. However, a least-squares solution for Equation (17) may be expressed using the reduced incidence matrix, provided that a value for one of the $T_j$ is fixed beforehand. It should be noted that the $T_j$ are nuisance parameters, and an estimation is not made to find their actual values, but to eliminate them such that Equation (14) can be solved for the transmitter locations. Because the $T_j$'s are part of Equation (14) as differences, and because Equation (17) can be used to estimate the $T_j$'s up to a single undetermined degree of freedom, a solution is thereby determined. Assume an arbitrary value for one of the $T_j$'s (e.g., $T_1$), $T_2, \ldots, T_N$ are then determined using a reduced incidence matrix as described above. Using the same conformal partition as described above and assuming an arbitrary value, $t_1$, for $T_1$, the remaining $T_j$ can be solved using a least-squares method or algorithm. Specifically, define:

$$\overline{Y} = \begin{bmatrix} \overline{Y}_1 \\ \overline{Y}_2 \\ \vdots \\ \overline{Y}_N \end{bmatrix} = \frac{1}{R}\sum_{i=1}^{R} Y_i \quad (18)$$

then Equation (17) results in:

$$\overline{D} = \Phi_1 t_1 + \Phi_R \begin{bmatrix} T_2 \\ T_3 \\ \vdots \\ T_N \end{bmatrix} + \Phi_1 \overline{Y}_1 + \Phi_R \begin{bmatrix} \overline{Y}_2 \\ \overline{Y}_3 \\ \vdots \\ \overline{Y}_N \end{bmatrix} \quad (19)$$

from which, after a sequence of steps similar to those above, and as known in the art, the result is:

$$\begin{bmatrix} \overline{Y}_2 + q_2\overline{Y}_1 \\ \overline{Y}_3 + q_3\overline{Y}_1 \\ \vdots \\ \overline{Y}_N + q_N\overline{Y}_1 \end{bmatrix} = (\Phi_R^T\Phi_R)^{-1}\Phi_R^T(\overline{D} - \Phi_1 t_1) - \begin{bmatrix} T_2 \\ T_3 \\ \vdots \\ T_N \end{bmatrix} \quad (20)$$

Now the left-hand side of Equation (20) is a zero-mean random vector with (N−1)-by-(N−1) covariance matrix:

$$\sum_{\overline{Y}} = \frac{\sigma^2}{R}(I + QQ^T) \quad (21)$$

Because the random vector on the left-hand side of Equation (20) may be regarded as a residual, the least-squares solution is:

$$\begin{bmatrix} \hat{T}_2 \\ \hat{T}_3 \\ \vdots \\ \hat{T}_N \end{bmatrix} = (\Phi_R^T\Phi_R)^{-1}\Phi_R^T(\overline{D} - \Phi_1 t_1) \quad (22)$$

The final estimate of the transmission time vector, with $t_1$ as its first element, can then be substituted into the objective function described above.

Therefore, the method includes the following steps:

Select a starting point on the plane for each of the N transmitters.

For the current transmitter locations, compute the vector of $T_j$'s as defined in Equation (22). Select a value of $t_1$, such as 0.

Substitute the newly computed values of the $T_j$ into Equation (14) and numerically minimize $J(\Theta|\delta_1, \delta_2, \ldots, \delta_R)$ by varying the transmitter locations, keeping the transmission times fixed.

If the total change in the location estimates is less than $\epsilon$, then stop, otherwise compute the vector of $T_j$'s as defined in Equation (22).

Having TOA data from a large number of transmitters increases the accuracy of the location estimates. Further, the accuracy of the method can be increased through the use of beacon transmitters. These transmitters will be exactly like the mobile transmitters in their transmission format, but their transmission burst rate are higher than that of the mobile devices 7 because their TOA's will be used in computations more often than those of the mobile devices 7. It should be noted that the beacon devices 6 have known locations and the locations of the receivers are also known. However, the time of the transmissions of the beacon devices 6 do not have to be known, such that they do not have to be synchronized to the system. The use of this embodiment is useful compared to the deployment of many receivers with overlapped coverage.

Further, in order to implement the computation using TOA measurements taken from beacon devices 6, the objective function of Equation (14) is used, and the known quantities are substituted at every iteration. The known quantities are the locations of each beacon device 6. It should be noted that the transmission times of the beacon devices 6 are not assumed to be known. If the transmission times are known, the resulting location estimates would be more accurate.

In the asset tag location system, the algorithm described herein would be run on a central computer that would be attached to all the base stations 3 by a low-bandwidth wired network. For every received tag transmission, every base station 3 would send to the central computer the difference between the estimated TOA of the tag transmission and the estimated TOA of the last beacon transmission for every beacon device 6. If the beacon devices 6 transmit a burst every T milliseconds, then the base stations 3 is configured to time out and represent an interval of duration T milliseconds to a high enough degree of precision that the TOA estimation error is the dominant error in the measurements. This goal will be achieved if the error in the timekeeping is less than 10% of the variance of the measurement error of the differences of tag and beacon TOA's.

It should be noted that the beacon transmissions can overlap, because there are a multiplicity of them in a fixed interval, and because of the time for the transmissions to occur. This overlap does not result in any problem in the various embodiments of the present invention, because the TR/DH modulation scheme used in the transmissions allows the times of arrival from overlapping transmissions to be independently measured, without interference between the measurements.

One source of additional information for error reduction is the use of floor-plan constraints. The location algorithm can be equipped with a "map" of the hospital which describes each possible location with a quantity representing the likelihood that a patient or piece of equipment might be there. This could be used, for example, to construct an a priori distribution in an explicitly Bayesian location estimation scheme. Such an a priori distribution would have relatively large values associated with allowable tag locations and small or zero values associated with tag locations that were not physically possible. The log likelihood function of (7) would be modified by the addition of the log of the a priori distribution, which would produce the log of the a posteriori distribution. The addition of the log a priori distribution would have the effect of adding a penalty function to the objective function in the numerical optimization procedure, which might modify the location of the maximum. The "maximum a posteriori probability" estimate found by locating the mode of the a posteriori distribution will incorporate the available knowledge of the floor plan.

In one embodiment, a location estimation system comprises a plurality of base stations 3 distributed within the tracking area and connected by cabling to a centrally located processor. The system also comprises a plurality of fixed beacon transmitters distributed within the tracking area, the locations of which are known to the system. A mobile asset tag transmits a transmitted reference, delay-hopped UWB signal made up of pulse pairs according to the modulation method described above. The plurality of fixed beacon transmitters also transmit such signals, and their transmissions are not synchronized to the location estimation system in any way. The transmissions are RF bursts, which are structured as packets of binary information using the TR/DH modulation scheme. At least part of the information contained in each such packet is a unique identifier of the transmitter that originated the RF burst. Assuming that an asset tag transmission and at least one fixed beacon transmission is received by at least three base stations 3, the centrally located processor can solve for the asset tag's (x,y) or (length, width) position by the algorithm given above.

In accordance with another embodiment, the system and method of the present invention monitors physiological data (e.g., cardiac information from heart patients) of the patients carrying mobile devices 7. Configured in this manner, such a system would be a medical telemetry system that uses TR/DH communications to transmit EKG and other physiological data from patient data transmitters worn by ambulatory patients. These transmissions would be received by antennas located all over the hospital, and the transmitted waveforms would be displayed at a central station for monitoring.

In this application, the mobile devices 7 transmit the physiological data in the TR/DH-UWB modulation format to enable the base station 3 to perform tracking and patient monitoring functions simultaneously, or serially, if desired. If known-data fields are embedded in the TH/DH-UWB transmission, then these fields can be treated by the base stations 3 in the same way that the asset tag bursts are treated. Their TOA's can be estimated and compared to the TOA's of beacon transmissions. These differences can be sent to a central processor 1 for estimation of the location of the transmitter in the same way as the asset tag data.

Advantageously, unlike conventional TDOA systems that use a distributed system clock, the systems described hereinabove use fixed transmitters placed at known locations in the tracking environment. Each fixed transmitter operates on its own local clock that does not have to be synchronized with a system clock. The fixed transmitters send message packets at regular time intervals, and the difference in arrival time between the fixed transmitter packet and the mobile tag transmitter packet is measured in each receiver using the receiver's local clock. The arrival time difference is then sent via a local area network to the location processor where it is used to compute the mobile tag location using a maximum likelihood algorithm.

The fixed transmitters replace a distributed system clock and are used to characterize the local multipath environment, temperature and humidity variations. A separate TOA packet is not transmitted to the location processor to perform calibration because the time difference between the fixed and mobile packets is transmitted. This reduces the use of LAN bandwidth in the system. In addition, special searching or triggering of the received signal to detect the direct path of the transmitted RF signal does not have to be performed. The receiver provides a signal that represents the average multipath signal from the local environment, which is compared to that received from a fixed transmitter in the same general area.

While the invention has been described in terms of exemplary embodiments, those skilled in the art will recognize that the exemplary embodiments of the invention can be practiced with modifications within the spirit and scope of the appended claims.

What is claimed is:

1. A method for determining a location of at least one transmitting object within an area of interest, comprising:
    transmitting wireless signals from a plurality of transmitting objects to at least three receivers;
    transmitting signals from a plurality of beacon transmitters to the at least three receivers, each of said plurality of beacon transmitters being at a known location and having an independent local clock;
    calculating, at each of the at least three receivers, a plurality of time differences of arrival data based on respective signals from said plurality of beacon transmitters and the wireless signals transmitted from the plurality of transmitting objects; and
    determining the location of the at least one of the plurality of transmitting objects within said area of interest based on said plurality of time differences of arrival data from said at least three receivers.

2. The method of claim 1, wherein said wireless signals comprise RF signals.

3. The method of claim 2, wherein said RF signals comprise UWB signals.

4. The method of claim 3, wherein said UWB signals comprise TR-UWB signals.

5. The method of claim 3, wherein said UWB signals comprise TR/DH UWB signals; and wherein the step of transmitting TR/DH UWB signals comprises generating pairs of pulses separated by a time interval D and encoding by relative polarity of pulses of said pairs; and wherein the step of calculating time difference of arrival data comprises delaying received signals by the time interval D.

6. The method of claim 5, wherein the step of transmitting further comprises generating the pairs of pulses at a pulse repetition rate which is variable in order to shape a spectrum of transmission.

7. The method of claim 5, wherein the TR/DH UWB signals are transmitted from a plurality of objects, each TR/DH UWB signal having a different time interval D between pulses of said pairs.

8. The method of claim 7, wherein the step of transmitting the UWB signals further includes transmitting medical information of a patient with the UWB signals.

9. The method of claim 3, wherein the step of transmitting the UWB signals is performed by a transmitter carried by a patient, and wherein said area of interest is a medical facility.

10. The method of claim 3, wherein the step of transmitting the UWB signals is performed by a transmitter attached to medical equipment, and wherein said area of interest is a medical facility.

11. The method of claim 1, wherein the step of determining the location of the at least one of the plurality of transmitting objects comprises using a least squares algorithm.

12. A system for determining a location of an object within an area of interest, comprising:
a mobile device carried by each of a plurality of objects, said mobile device including a transmitter for transmitting a wireless signal, the wireless signal comprising a TD/DH UWB (transmitted-reference, delayed hopped ultra-wide band) RF signal;
at least three base stations within said area of interest, each of said at least three base stations comprising a detector for detecting wireless signals transmitted from a plurality of said mobile devices, and further comprising a processor for deriving time difference of arrival information based on the detected wireless signals, the detector comprising a pulse-pair correlator; and
a controller for determining the location of at least one of the objects within said area of interest based on the time difference of arrival information calculated by each of the three base stations.

13. The system of claim 12, wherein said transmitter transmits said TR/DH UWB signals having a variable pulse repetition time.

14. The system of claim 12, wherein at least one of said objects is a patient and said area of interest is a medical facility.

15. The system of claim 12, wherein at least one of said objects is medical equipment and said area of interest is a medical facility.

16. The system of claim 12, wherein the transmitter of the mobile device transmits medical information of said patient with the RF signal.

17. A method for determining a location of a transmitting object within an area of interest, comprising:
receiving a plurality of wireless signals from a plurality of transmitting objects, the plurality of wireless signals received by at least three receivers, the signals comprising pair of pulses separated by a time interval D; and
determining the location of least one of the transmitting objects within said area of interest based on time difference of arrival information calculated at each of the at least three receivers, said calculation of the time difference of arrival information based on the plurality of wireless signals delayed by the time interval D.

18. A system for determining a location of an object within an area of interest, comprising:
a mobile device carried by each of a plurality of objects, said mobile device including a transmitter for transmitting a wireless signal;
at least three base stations within said area of interest, each of said at least three base stations comprising a detector for detecting wireless signals transmitted from the plurality of said objects each carrying said mobile device, the detector comprising a pulse-pair correlator and each of said at least three base stations further comprising a processor for deriving time difference of arrival information based on the detected wireless signals; and
a controller for determining the location of at least one of the plurality of objects within said area of interest based on the time difference of arrival information calculated by each of the three base stations.

19. The method of claim 17, wherein said wireless signals comprise TR/DH UWB RF signals.

20. The method of claim 17, wherein the step of determining the location of the at least one of the objects comprises using a least squares algorithm.

21. The system of claim 18, wherein said wireless signals comprise TR/DH UWB RF signals.

22. The system of claim 18, wherein said transmitter transmits said wireless signals having a variable pulse repetition time.

* * * * *

UNITED STATES PATENT AND TRADEMARK OFFICE
CERTIFICATE OF CORRECTION

PATENT NO. : 7,499,711 B2
APPLICATION NO. : 10/609891
DATED : March 3, 2009
INVENTOR(S) : Hoctor et al.

It is certified that error appears in the above-identified patent and that said Letters Patent is hereby corrected as shown below:

In Column 12, Line 30, delete "k" and insert -- k. --, therefor.

In Column 13, Line 66, delete "$\mathbf{Y}_i$" and insert -- $\tilde{Y}_i$ --, therefor.

In Column 14, Line 13, delete "$\mathbf{Y}_i$" and insert -- $\tilde{Y}_i$ --, therefor.

In Column 15, Lines 61-65, Equation "(21)", delete "$\sum = \frac{\sigma^2}{R}(I + QQ^T)$" and insert -- $\Sigma_{\bar{Y}} = \frac{\sigma^2}{R}(I + QQ^T)$ --, therefor.

In Column 17, Line 61, delete "TH/DH-UWB" and insert -- TR/DH-UWB --, therefor.

In Column 18, Line 56, in Claim 4, delete "TR-UWB" and insert -- TR/DH-UWB --, therefor.

In Column 19, Line 23, in Claim 12, delete "TD/DH" and insert -- TR/DH --, therefor.

Signed and Sealed this

Sixteenth Day of March, 2010

David J. Kappos
*Director of the United States Patent and Trademark Office*